US005103210A

United States Patent [19]

Rode et al.

[11] Patent Number: 5,103,210

[45] Date of Patent: Apr. 7, 1992

[54] ACTIVATABLE/DEACTIVATABLE SECURITY TAG FOR USE WITH AN ELECTRONIC SECURITY SYSTEM

[75] Inventors: Francè Rode, Los Altos, Calif.; Anthony F. Piccoli, Audubon, N.J.

[73] Assignee: Checkpoint Systems, Inc., Thorofare, N.J.

[21] Appl. No.: 544,703

[22] Filed: Jun. 27, 1990

[51] Int. Cl.[5] .................... G02B 13/24

[52] U.S. Cl. .................... 340/572; 342/51

[58] Field of Search .................... 340/572; 342/51

[56] References Cited

U.S. PATENT DOCUMENTS

| | | | |
|---|---|---|---|
| 3,624,631 | 11/1971 | Chomet et al. | 340/572 |
| 3,810,147 | 5/1974 | Lichtblau | 340/572 |
| 3,913,219 | 10/1975 | Lichtblau | 29/592 |
| 3,967,161 | 6/1976 | Lichtblau | 340/572 |
| 4,498,076 | 2/1985 | Lichtblau | 340/572 |
| 4,567,473 | 1/1986 | Lichtblau | 340/572 |
| 4,598,276 | 7/1986 | Tait | 340/572 |
| 4,670,740 | 6/1987 | Herman et al. | 340/572 |
| 4,692,744 | 9/1987 | Hickman | 340/550 |
| 4,694,283 | 9/1987 | Reeb | 340/572 |
| 4,720,701 | 1/1988 | Lichtblau | 340/572 |
| 4,728,938 | 3/1988 | Kaltner | 340/572 |
| 4,745,401 | 5/1988 | Monteau | 340/572 |
| 4,774,504 | 9/1988 | Hartings | 340/572 |
| 4,792,790 | 12/1988 | Reeb | 340/572 |
| 4,831,363 | 5/1989 | Wolf | 340/572 |
| 4,835,524 | 5/1989 | Lamond | 340/572 |
| 4,864,280 | 9/1989 | van de Meij | 340/572 |
| 4,882,569 | 11/1989 | Dey | 340/572 |
| 4,910,499 | 3/1990 | Benge et al. | 340/572 |
| 4,920,335 | 4/1990 | Andrews | 340/572 |

*Primary Examiner*—Glen R. Swann, III

*Attorney, Agent, or Firm*—Panitch Schwarze Jacobs & Nadel

[57] ABSTRACT

A security tag is disclosed for use with an electronic security system for a controlled area. The tag comprises circuitry for initially establishing a resonant circuit having a first resonating frequency within a first frequency range which is outside of the range of the detection frequency of the electronic security system. The tag is activated by changing the resonating frequency of the resonant circuit to a second frequency within the detection frequency range by exposing the resonant circuit to electromagnetic energy within the first frequency range at the predetermined minimum power level to short-circuit a first circuit component. The tag is deactivated by again changing the resonant frequency of the resonant circuit to a third resonant frequency within a third frequency range which is also outside of the detection frequency range by exposing the resonant circuit to electromagnetic energy within the detection frequency range of at least a predetermined minimum power level to short-circuit a second circuit component.

9 Claims, 2 Drawing Sheets

ACTIVATABLE/DEACTIVATABLE SECURITY TAG FOR USE WITH AN ELECTRONIC SECURITY SYSTEM

BACKGROUND OF THE INVENTION

The present invention relates generally to security tags for use with an electronic security system for detecting the unauthorized removal of articles and, more particularly, to such security tags which are activatable and deactivatable.

The use of electronic article security systems for detecting and preventing theft of articles or goods from retail establishments and/or other facilities, such as libraries, has become relatively widespread. In general, such security systems employ a label or security tag which is affixed to, associated with, or otherwise secured to an article or item which is readily available to potential customers or facility users and therefore may be easily removed. Security tags may take on many different sizes, shapes and forms, depending upon the particular type of security system in use, the type and size of the article, etc. In general, such security systems are employed for detecting the presence or the absence of the security tag and thus a protected article generally as the protected article passes through or near a particular protected or security area. In most cases, the protected area is located at or around an exit or entrance to the retail establishment or other facility.

One such electronic article security system which has gained popularity utilizes a security tag which includes a self-contained, operatively tuned or resonant circuit in the form of a small, generally planar tag which resonates at a known predetermined detection frequency. A transmitter, which is also tuned to the particular detection frequency, is employed for transmitting electromagnetic energy into the protected or security area. A receiver, also tuned to the detection frequency, is positioned generally proximate to the protected area. Typically, the transmitter is located on one side of an exit and the receiver is located on the other side of the exit. In this manner, when an article having an attached security tag moves into or otherwise passes through the protected area, generally just before passing through the exit, the tag is exposed to the transmitted energy. Upon receiving the transmitted energy, the resonant circuit within the tag resonates, thereby providing an output signal detectable by the receiver. When the receiver detects such an output signal, indicative of the presence of an article with a security tag within the protected area, the receiver activates an alarm to alert appropriate security personnel.

While such systems are generally effective in deterring theft, there is a need to prevent the accidental activation of such security systems by a person who has actually purchased an article and, after paying for the article, is leaving the store or other facility. It is generally impractical to deactivate the entire security system so, in most cases, the security tag is, itself, deactivated. One method of deactivating the security tag is to physically remove the tag from the purchased article. However, removal of the tag, which is generally secured to an article in a manner designed to prevent removal by a would-be thief, can be difficult and time-consuming and requires, in some cases, additional removal equipment and/or specialized training. A second method of deactivating the security tag is to cover the security tag with a special shielding device, such as metallized sticker, to prevent the transmitted energy from reaching the resonant circuit. Again, while such stick-on shielding devices can be effective, they require additional time and effort at the checkout counter and permit thieves to identify an easy way in which to defeat the security system.

A more recent and generally more effective tag deactivation technique involves either short-circuiting the resonant circuit or creating an open circuit to completely prevent the circuit from resonating. Deactivatable tags of this type are disclosed in U.S. Pat. Nos. 4,498,076 entitled "Resonant Tag and Deactivator for Use in an Electronic Security System"; 4,728,938 entitled "Security Tag Deactivation System"; and 4,835,524 entitled "Deactivatable Security Tag," all of which are incorporated herein by reference.

Deactivatable tags of the type disclosed in the referenced patents have been shown to be effective and can be conveniently deactivated at a checkout counter by momentarily placing the tag above or near a deactivation device which subjects the tag to electromagnetic energy at a power level sufficient to cause the resonant circuit to either short or open, depending upon the structure of the tag. However, one drawback encountered with the use of such a tag deactivation system is that the tag must be maintained above or near the deactivation device for a time which is sufficient for complete deactivation. However, the person at the checkout counter generally has no way of knowing for sure that the security tag has been deactivated completely. As a result, when a customer leaves the retail facility with the article the tag may still resonate enough to activate the security system, particularly when the security system is very sensitive.

It is also desirable to have the ability to preplace a security tag, either on, within or upon the packaging of an article. Preplacing of a tag may be accomplished at the same time that the article is manufactured as a basic part of the manufacturing process or as part of the packaging or shipping process for the article. In this manner, as the article passes through its distribution chain, when it finally arrives at the retail level, the retail store need not go to the trouble and expense of adding a security tag to the article. One drawback of a preplaced tag is that the retail facility which markets the article to the public may or may not utilize an electronic security system. Since it is impractical for a manufacturer to be able to differentiate between products having a tag associated therewith and products having no tag associated, the manufacturers incorporate the tag into all products or packaging therefor. Hence, there is a need for a security tag which can be selectively activated by a retailer if the retailer utilizes an electronic security system and which will have no detrimental effect in the event that the retailer does not utilize an electronic security system.

The present invention overcomes many of the problems associated with the prior art by providing a security tag which is both activatable and deactivatable. The security tag, when received by a user, such as a retailer, is generally preapplied to an article or the packaging for the article and has a resonant circuit initially tuned to a first resonant frequency which is above or outside of the detection frequency range of the security system and thus is unusable. When it is desired to activate the tag for use, the tag is exposed to electromagnetic energy at the first frequency and with sufficient power to fuse and short-circuit a controlled portion of the tag, thereby changing the resonant frequency of the tag to a second resonant frequency which is within the detection frequency range of the security system. Proper activation of the security tag can be verified by exposing the tag to electromagnetic energy within the detection frequency range and confirming that the resonant circuit resonates. Once activated, the tag may be secured to an article in any known manner for security purposes. Alternatively, the security tag could be secured to the article prior to activation. If the tag is not activated, it will not interact with or otherwise affect or be affected by the electronic security system.

When a customer purchases the article, the security tag is deactivated by exposing the resonant circuit to electromagnetic energy at the detection frequency and with sufficient power to again fuse and short-circuit a controlled portion of the security tag. The short-circuiting of the second portion of the security tag changes the resonant frequency of the tag to a third frequency within a third frequency range which is also outside of the detection frequency range. Proper deactivation of the security tag may be conveniently verified by exposing the resonant circuit to electromagnetic energy within the third frequency range and determining whether the resonant circuit resonates. If the resonant circuit resonates at the third frequency, it is precluded from resonating at the detection frequency and, therefore, the security tag will not accidentally trigger a security system as the purchaser leaves the retail store facility with the purchased article.

SUMMARY OF THE INVENTION

Briefly stated, the present invention comprises a security tag for use with an electronic security system for a controlled area. The tag comprises circuitry means for initially establishing a resonant circuit having a first resonating frequency within a first frequency range which is outside of the detection frequency range of the electronic security system. First means are provided for changing the resonating frequency of the resonant circuit to a second frequency within the detection frequency range of the electronic security system when the resonant circuit is exposed to electromagnetic energy within the first frequency range and of at least a predetermined minimum power level. Second means are provided for changing the resonating frequency of the resonant circuit to a third frequency within a third frequency range which is outside of the detection frequency range of the electronic security system when the resonant circuit is exposed to electromagnetic energy within the detection frequency range and of at least a predetermined minimum power level.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed. In the drawings.

DESCRIPTION OF PREFERRED EMBODIMENT

Figure 4:
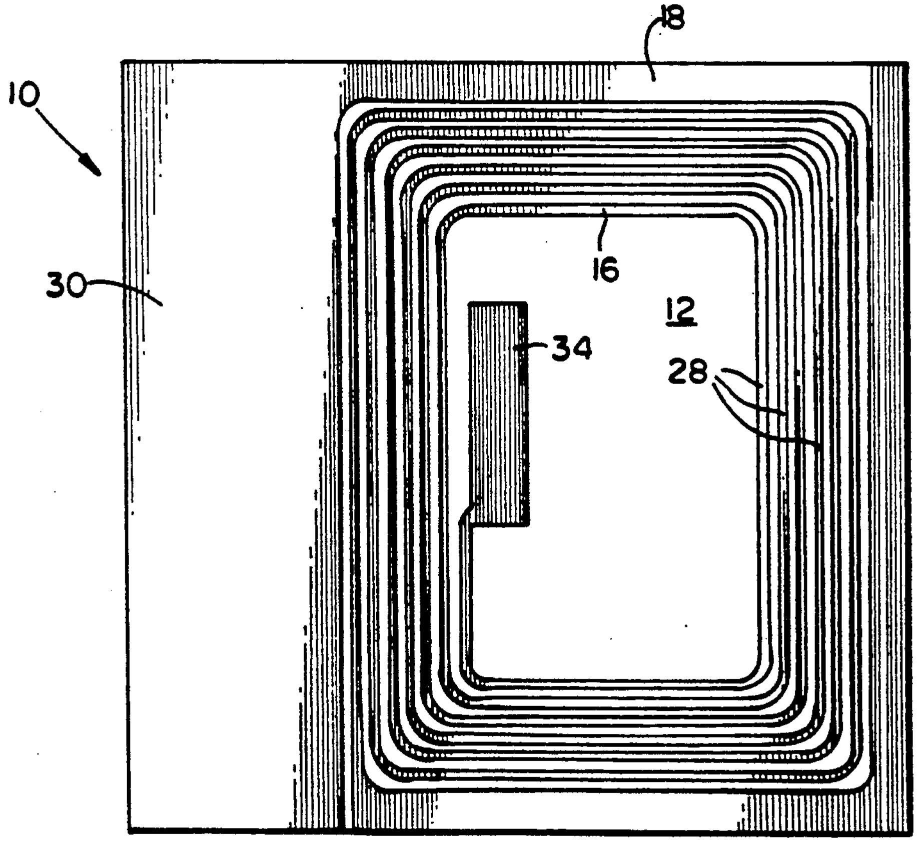
FIG. 4 is a top plan view of a preferred embodiment of a printed circuit security tag in accordance with the present invention.
Figure 5:
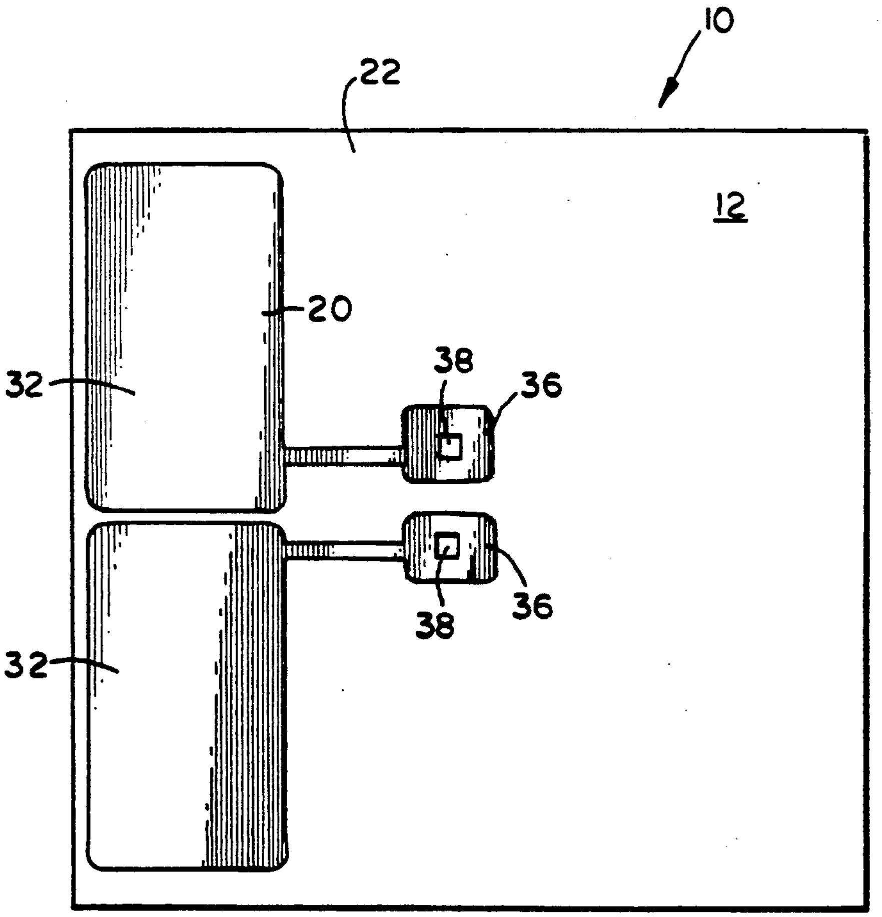
FIG. 5 is a bottom plan view of the security tag of FIG. 4.

Referring to the drawings, wherein the same reference designations are applied to corresponding components throughout the figures, there is shown in FIGS. 4 and 5 a preferred embodiment of a security tag or tag 10 in accordance with the present invention. The tag 10 is generally of a type which is well known in the art of electronic security systems and, as is also well known in the art, is adapted to be secured to or otherwise borne by an article or item of personal property, or the packaging of such article (not shown), for which security or surveillance is sought. The tag 10 may be secured to the article or its packaging at a retail or other such facility or may be secured to or incorporated into the article or its packaging by the manufacturer. In the presently preferred embodiment, the tag 10 is comprised of an insulative substrate 12 fabricated of a material well known in the art having predetermined insulative and dielectric characteristics. The tag 10, as shown in FIGS. 4 and 5, is comprised of circuitry means for initially establishing a resonant circuit 14 (hereinafter described in greater detail) by forming predetermined circuit elements which will hereinafter be described. The circuit elements are formed by the combination of a first conductive pattern 16 imposed on a first or front surface 18 of the substrate 12 and a second conductive pattern 20 on the opposite or rear surface 22 of the substrate 12. The conductive patterns 16 and 18 are formed on the front and rear surfaces 18, 20 of the substrate 12 utilizing electrically conductive materials of a known type, such as aluminum, in a manner which is well known in the electronic article surveillance art and which is described in detail in U.S. Pat. No. 3,913,219 entitled, "Planar Circuit Fabrication Process," which is incorporated herein by reference. It will, of course, be appreciated by those skilled in the art that the particular conductive patterns 16 and 20 shown in FIGS. 4 and 5 are only for the purpose of illustrating a presently preferred embodiment of the invention and that numerous other conductive patterns may be developed as alternative embodiments of the invention. Similarly, while it is presently preferred that the known materials and methods set forth in the above-referenced U.S. Pat. No. 3,913,219 and other prior art be employed for the purpose of fabricating the security tag 10, it will be appreciated by those skilled in the art that any other suitable material and/or fabrication methods could alternatively be employed. In addition, while the present invention is illustrated as being implemented by way of a generally planar tag 10 formed on the substrate 12 utilizing printed circuit technology, it will be appreciated by those skilled in the art that the tag 10 could be fabricated in some other completely different manner, for example, utilizing the technology employed in the formation of components in semiconductors or by utilizing discrete circuit components. Thus, it should be clearly understood that the particular security tag 10 shown in FIGS. 4 and 5 is solely for the purpose of illustrating a single, presently preferred embodiment of the invention and should not be considered a limitation upon the claimed invention.

As discussed above, the security tag 10 is for use with an electronic security system (not shown) employed to provide article security for a controlled area. The security system includes a transmitter means or transmitter (not shown), of a type well known in the art, for transmitting into the controlled area electromagnetic energy, preferably radio frequency energy, within a predetermined detection frequency, preferably at about 8.2 Mhz. The electronic security system further includes a receiver means or receiver (not shown), also of a type well known in the art, for detecting the presence of a tag resonating within the controlled area in response to the transmitted electromagnetic energy. Electronic security systems of this type are generally well known in the art and are commercially available from several manufacturers, including Checkpoint Systems, Inc., the assignee of the present invention. Such electronic security systems are described in detail in U.S. Pat. No. 4,831,363, each of which is incorporated herein by reference. Complete details of the structure and operation of such electronic security systems are not necessary for an understanding of the present invention. Such details may be obtained by referring to the above-identified patents and/or from the manufacturers of such electronic security systems.

Figure 1:
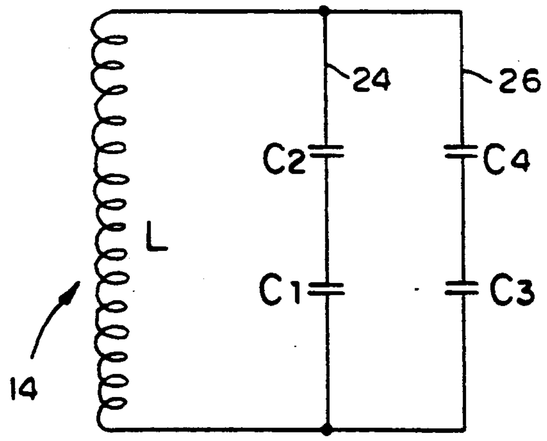
FIG. 1 is an electrical schematic of the resonant circuit of a security tag in an initial condition in accordance with the present invention.

As indicated above, the tag 10 is comprised of circuitry means or electrical circuitry for initially establishing a resonant circuit 14 which is schematically illustrated by FIG. 1. The resonant circuit 14 is comprised of an inductance component or inductor L which is connected in parallel with a first capacitance branch 24 and with a second capacitance branch 26. In the presently preferred embodiment, the first capacitance branch 24 includes a first capacitor C1 connected in series with a second capacitor C2. Similarly, the second capacitance branch 26 includes a third capacitor C3 connected in series with a fourth capacitor C4. In the tag 10 shown in FIGS. 4 and 5, the inductor L is formed by the coiled portion 28 of the first conductive pattern 16 on the front tag surface 18 (FIG. 4). Similarly, capacitors C1 and C3 are formed by the large aligned plates 30 of the first conductive pattern 16 and 32 of the second conductive pattern 20 on the rear tag surface 22. Capacitors C2 and C4 are formed by the smaller aligned plates 34 of the first conductive pattern 16 and 36 of the second conductive pattern 20. The size or values of the inductor L and the four capacitors C1, C2, C3 and C4 are determined based upon the desired resonant frequencies of the resonant circuit 14 and the need to maintain a low induced voltage across the plates of the capacitors. For reasons which will hereinafter become apparent, capacitor C1 and C3 are selected to be much larger than capacitors C2 and C4 so that the primary voltage drop in each capacitance branch 24, 26 appears across capacitors C2 and C4. As is well known in the art, the frequency of an inductance/capacitance circuit of the type shown in FIG. 1 is established by the following formula:

$$f = \frac{2\pi}{\sqrt{L}} \cdot \frac{1}{\sqrt{C}} \qquad (1)$$

Where:

f is the resonant frequency of the circuit;

L is the total inductance; and

C is the total capacitance.

When the resonant circuit is comprised of two parallel capacitance branches, each of which includes two capacitors connected in series, the resonant frequency is established by the following formula:

$$f_1 = \frac{2\pi}{\sqrt{L}} \cdot \frac{1}{\sqrt{\frac{C1 \cdot C2}{C1 + C2} - \frac{C3 \cdot C4}{C3 + C4}}} \qquad (2)$$

As discussed above, the first resonating frequency ($f_1$) of the resonant circuit 14 in its initial configuration as shown in FIG. 1, is selected to be within a first frequency range which is outside of the detection frequency range of the electronic security system with which the tag 10 is to be employed. For purposes of illustrating the presently preferred embodiment, the preferred frequency for the electronic security system will be assumed to be 8.2 MHz. Thus, in forming the initial resonant circuit 14 the values of the inductor L and the four capacitors C1, C2, C3, C4 are, for purposes of illustrating the invention, are selected to provide a first resonant frequency of about 16 Mhz. Thus, in the form illustrated by FIG. 1, the resonant frequency of the resonant circuit 14 is established to be at a first resonating frequency (16 MHz) which is above or outside of the detection frequency range. Accordingly, if the resonant circuit 14 illustrated in FIG. 1 is placed within the controlled area of an electronic security system operating at a detection frequency of 8.2 MHz, the resonant circuit 14 does not resonate and, therefore, a security tag 10 having such a resonant circuit is ineffective. In this manner, a tag 10 which is secured to an article by the article manufacturer, and which is not activated as described below, does not generate an alarm when passing through a security system.

In order to activate the security tag 10, it is necessary to change the resonating frequency ($f_1$) of the resonant circuit 14 to a second frequency ($f_2$) which is within the detection frequency range and, preferably, is about 8.2 MHz. In the presently preferred embodiment, first means are provided for making the change in the resonating frequency. The first means preferably comprises one of the second and fourth capacitors C2, C4, each of which includes fusing means for short-circuiting the plates of the capacitor when exposed to electromagnetic energy within the first frequency range, preferably at about 16 MHz. In the presently preferred embodiment, the fusing means comprises placing an indentation or "dimple" 38 on the conductive pattern portions 36 on the rear tag surface 22, employed for establishing capacitors C2 and C4. The use of such indentations or dimples is well known in the art and is exemplified by U.S. Pat. No. 4,498,076, the disclosure of which is incorporated herein by reference.

Figure 2:
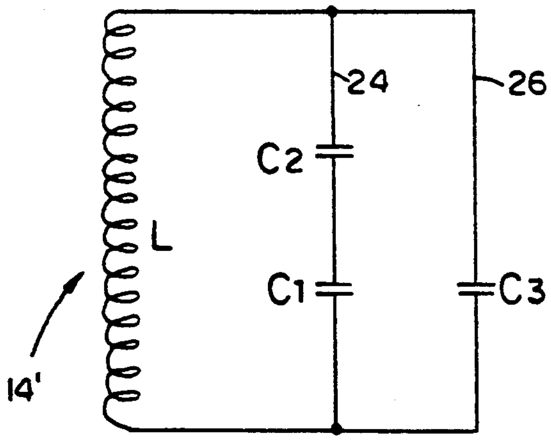
FIG. 2 is an electrical schematic of the resonant circuit shown in FIG. 1 with a first capacitor short-circuited.

Exposing the resonant circuit 14 of FIG. 1 to electromagnetic energy at the first resonance frequency ($f_1$) at a predetermined minimum power level results in a buildup of induced voltage between the plates of capacitors C2 and C4 and, due to the dimples 38 diminishing the dielectric between the capacitor plates, one of the capacitors C2 or C4 breaks down and becomes short-circuited, and is thereby eliminated from the resonant circuit 14 to establish substantially a new resonant circuit 14' illustrated in FIG. 2. In the presently preferred embodiment, the capacitance or values of C2 and C4 are equal so that it does not matter which one of capacitors C2 and C4 is short-circuited. However, for purposes of illustrating the present invention, it is assumed in FIG. 2 that capacitor C4 is the one which is initially short-circuited. The resonant frequency ($f_2$) of resonant circuit 14' is now established by the following formula:

$$f_2 = \frac{2\pi}{\sqrt{L}} \cdot \frac{1}{\sqrt{\frac{C1 \cdot C2}{C1 + C2} + C3}} \quad (3)$$

Assuming that the values of the components are properly selected, the second resonant frequency ($f_2$) is within the detection frequency range and, preferably, is about 8.2 Mhz. Thus, the activated tag 10 having a resonant circuit 14', as illustrated in FIG. 2, can be employed in connection with an electronic security system of the type described above and is effective for its normal intended use in detecting and identifying the presence of articles to which a tag 10 has been secured which are placed within the controlled area of the security system.

Figure 3:
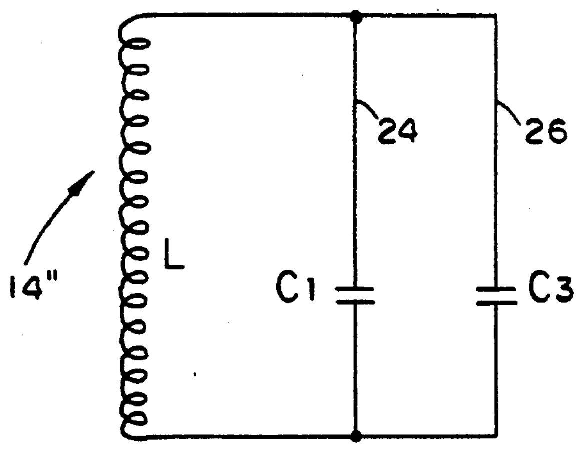
FIG. 3 is an electrical schematic representation of the resonant circuit of FIG. 1 with two capacitors short-circuited.

As also discussed above, it is desirable to have the ability to effectively and conveniently deactivate the tag 10 in order to prevent a tag which is secured to an article which has been purchased from interacting with the electronic security system. In general, it is desirable to deactivate the tag 10 in conjunction with purchasing activities performed at a checkout counter or other such facility at which a customer purchases a selected article. Preferably, deactivation of the tag 10 can be accomplished as the price of the article is being scanned. Accordingly, the tag 10 includes a second means for changing the resonating frequency of the resonant circuit 14' to a third frequency ($f_3$) within a third frequency range which is also outside of the detection frequency range. In the present preferred embodiment, the second means comprises the other of the second and fourth capacitors C2 and C4 and, in the embodiment illustrated in FIG. 2, comprises the second capacitor C2. Exposing the activated tag 10 to the detection frequency with at least a predetermined minimum power level results in a buildup of induced voltage between the plates of capacitor C2 and, due to the dimple 38 diminishing the dielectric between the capacitor plates, capacitor C2 breaks down and short-circuits, thereby eliminating capacitor C2 from the resonant circuit and effectively establishing a new resonant circuit 14", illustrated in FIG. 3. The resonant frequency ($f_3$) of resonant circuit 14" is preferably below the detection frequency range (on the order of 6 MHz), and is determined by the following formula:

$$f_3 = \frac{2\pi}{\sqrt{L}} \cdot \frac{1}{\sqrt{C1 + C3}} \quad (4)$$

Once a security tag 10 has been deactivated as described above, it can be exposed to a source of electromagnetic energy within the third frequency range and preferably at the third resonant frequency ($f_3$). If the tag 10 resonates at the third resonating frequency ($f_3$), as determined by a suitable receiver, this will confirm that the tag 10 has effectively been deactivated and, therefore, cannot resonate at the detection frequency. In this manner, the tag 10 no longer interacts with the electronic security system and, therefore, accidental or false security alarms are effectively avoided.

From the foregoing description, it can be seen that the present invention comprises an activatable/deactivatable security tag for use with an electronic security system. It will be recognized by those skilled in the art that changes may be made to the above-described embodiment of the invention without departing from the broad inventive concepts thereof. It is understood, therefore, that this invention is not limited to the particular embodiment disclosed, but is intended to cover any modifications which are within the scope and spirit of the invention as defined by the appended claims.

We claim:

1. A security tag for use with an electronic security system for a controlled area, the security system including transmitter means for transmitting into the controlled area electromagnetic energy within a predetermined detection frequency range and receiver means for detecting within the controlled area the presence of a security tag resonating in response to the electromagnetic energy, the tag comprising:

circuitry means for initially establishing a resonant circuit having a first resonating frequency within a first frequency range which is outside of the detection frequency range;

first means for changing the resonating frequency of the resonant circuit to a second frequency, within the detection frequency range, when the resonant circuit is exposed to electromagnetic energy within the first frequency range of at least a predetermined minimum power level; and second means for changing the resonating frequency of the resonant circuit to a third frequency within a third frequency range which is outside of the detection frequency range when the resonant circuit is exposed to electromagnetic energy within the detection frequency range of at least a predetermined minimum power level.

2. The security tag as recited in claim 1 wherein the circuitry means initially comprises:

an inductance;

a first capacitance branch connected in parallel with the inductance, the first capacitance branch including a first capacitor connected in series with a second capacitor; and a second capacitance branch connected in parallel with the inductance and the first capacitance branch, the second capacitance branch including a third capacitor connected in series with a fourth capacitor.

3. The security tag as recited in claim 2 wherein the first means comprises one of the second and fourth capacitors and wherein the second means comprises the other of the second and fourth capacitors, the second and fourth capacitors each including fusing means for short-circuiting one of said second and fourth capacitors upon exposure to said electromagnetic energy within the first frequency range for changing the resonating frequency of the resonant circuit from said first frequency to said second frequency and for short-circuiting the other of said second and fourth capacitors upon exposure to said electromagnetic energy within the detection frequency range for changing the resonating frequency of the resonant circuit from said second frequency to said third frequency.

4. The security tag as recited in claim 3 wherein the first and third capacitors are generally of the same capacitance and wherein the second and fourth capacitors are generally of the same capacitance.

5. The security tag as recited in claim 1 wherein the first frequency range is higher than the detection frequency range and the third frequency range is lower than the detection frequency range.

6. A security tag for use with an electronic security system for a controlled area, the security system including transmitter means for transmitting into the controlled area electromagnetic energy within a predetermined detection frequency range and receiver means for detecting within the controlled area the presence of a tag resonating in response to the electromagnetic energy, the tag comprising:

a resonant circuit having a first resonating frequency within a first frequency range which is outside of the detection frequency range, the circuit comprising an inductance, a first capacitance branch connected in parallel with the inductance, the first capacitance branch including a first capacitor connected in series with a second capacitor, and a second capacitance branch connected in parallel with the inductance and the first capacitance branch, the second capacitance branch including a third capacitor connected in series with a fourth capacitor;

the capacitance of the first and third capacitors being generally the same and the capacitance of the second and fourth capacitors being generally the same, the second and fourth capacitors each including a fusing means for selectively short circuiting said second and fourth capacitors whereby when the resonant circuit is exposed to electromagnetic energy within the first frequency range of at least a predetermined minimum power level, one of the second and fourth capacitors is short circuited to change the resonating frequency of the resonant circuit to a second frequency within the detection frequency range and when the resonant circuit is thereafter exposed to electromagnetic energy within the detection frequency range of at lest a predetermined minimum power level, the other of the second an fourth capacitors is short circuited to change the resonating frequency of the resonant circuit to a third frequency within a third frequency range which is outside of the detection frequency range.

7. The security tag as recited in claim 6 wherein the first frequency range is higher than the detection frequency range and the third frequency range is lower than the detection frequency range.

8. A method of operating an electronic security system for a controlled area, the security system including transmitter means for transmitting into the controlled area electromagnetic energy within a predetermined detection frequency range and receiver means for detecting within the controlled area the presence of a tag resonating in response to the electromagnetic energy, the method comprising:

providing a tag associated with an article for which surveillance is sought, the tag including a resonant circuit initially having a first resonating frequency within a first frequency range which is outside of the detection frequency range;

activating the tag by exposing the resonant circuit to electromagnetic energy within the first frequency range of at least a predetermined minimum power level for changing the resonating frequency of the resonant circuit to a second frequency which is within the detection frequency range; and deactivating the tag by exposing the resonant circuit to electromagnetic energy within the detection frequency range of at least a predetermined minimum power level for changing the resonating frequency of the resonant circuit to a third frequency within a third frequency range which is outside of the detection frequency range.

9. The method as recited in claim 8 further comprising the step of:

determining that the tag has been deactivated by confirming that the resonating frequency of the resonant circuit is within the third frequency range.

* * * * *